2,997,371
RECOVERING OF BF₃ FROM ADMIXTURE WITH HYDROCARBONS
Francis T. Wadsworth, Dickinson, and Leon M. Adams, La Marque, Tex., assignors, by mesne assignments, to Standard Oil Company, Chicago, Ill., a corporation of Indiana
No Drawing. Filed Dec. 1, 1958, Ser. No. 777,208
4 Claims. (Cl. 23—205)

This invention relates to recovery of $BF_3$ from admixture with hydrocarbons. Particularly from admixture with non-condensible hydrocarbons such as methane and ethane.

Boron trifluoride has recently become of some interest in conversion of hydrocarbons; large amounts of $BF_3$ are utilized as a catalyst, for example, in connection with a solid catalyst, $BF_3$ is used to promote the reaction of ethylene-isobutane. In another system, $BF_3$ is used in connection with liquid HF to promote conversion of aromatic hydrocarbons. In these operations, recovery and recycle of $BF_3$ is necessary for economic operation. In all hydrocarbon conversions there is a build-up of lower boiling hydrocarbons and even the non-condensible hydrocarbons such as methane and ethane. As $BF_3$ cannot easily and economically be separated from admixture with ethane and methane, purging must be resorted to in order to maintain a lower level of these hydrocarbon gases within the system. The loss of $BF_3$ in such purging can be a serious economic penalty against the process utilizing large amounts of $BF_3$ as a catalyst.

It is well known that many nitriles form adducts with $BF_3$, for example, aceto nitrile and benzonitrile react with $BF_3$ to form solid crystalline adducts. These adducts reversibly release $BF_3$ upon heating to elevated temperatures. The need for handling a crystalline adduct complicates the use of these nitriles as $BF_3$ recovery agents.

An object of the invention is an economic process for recovering $BF_3$ from admixture with hydrocarbon gases such as ethane or methane. Another object is a method of obtaining essentially pure $BF_3$ from a $BF_3$-rich material containing impurities such as hydrocarbon gases. Other objects will become apparent in the course of the detailed description of the invention.

It has been discovered that polyacrylonitrile, deposited on an inert particulate support, is an extremely efficient agent for removing $BF_3$ from admixture with hydrocarbons, particularly the non-condensible hydrocarbons such as ethane and methane. The solid mass consisting essentially of polyacrylonitrile on an inert particulate support is contacted with the gaseous mixture comprising hydrocarbons and $BF_3$ at a temperature such that $BF_3$ adducts with the polyacrylonitrile. In general, the contacting operation is carried out at temperatures below about 75° C. The temperature of the reaction is preferably within ordinary atmospheric temperatures between about 0° C. and 35° C.; more usually, the temperature will be between about 20° C. and 50° C. The $BF_3$ is cleanly released from the solid mass by heating said mass to a temperature at least about 100° C. and preferably between about 120° C. and 150° C. In addition to the $BF_3$, any hydrocarbons which may have been adsorbed are released—however, even with an efficient adsorbent such as activated carbon, a $BF_3$-rich gaseous product is obtained.

The inert particulate support may be an adsorbent such as activated carbon, activated alumina, silica gel, etc., or may be a non-porous solid such as alumina, quartz, etc. Preferably, the support is in a finely divided particulate state in order to provide a very large surface for contacting between the gaseous stream and the solid mass. Activated carbon is particularly suitable as a support.

The polyacrylonitrile may be deposited on the surface of the support from solution in solvent. Preferably, the polyacrylonitrile is formed in situ by impregnating, for example, saturating the support with acrylonitrile, followed by polymerizing the acrylonitrile to form a coating of polyacryonitrile on the surface. The polymerization may be continued for a time sufficient to react all of the acrylonitrile or only a portion thereof. If all of the acrylonitrile is not polymerized, the excess is preferably stripped from the solid mass before contacting the mass with the $BF_3$ containing gaseous mixture.

*Example*

The invention is illustrated by the preparation of a solid mass consisting of activated carbon and polyacrylonitrile. A commercial activated carbon was impregnated with acrylonitrile; this acrylonitrile contained 1% of t-butyl hydroperoxide and 0.5% thiourea. The impregnated carbon was heated in a nitrogen atmosphere at 100° C. for 2 hours in order to polymerize the acrylonitrile. The acrylonitrile, which had not reacted, was stripped from the mass by passing nitrogen through the mass at 100° C.

The solid mass, prepared as above, was charged to a stainless steel pipe. A mixture of $BF_3$ and ethane containing 18 mole percent of $BF_3$ was introduced at the bottom of the column of polyacrylonitrile-carbon particles and passed upward therethrough. The pressure in the contacting chamber was maintained at 100 p.s.i.g. The temperature within the contacting chamber varied between 30° C. and 40° C. over the course of the run. The effluent gaseous stream was at first completely free of $BF_3$. The introduction of $BF_3$ containing feed gas was stopped when an appreciable amount of $BF_3$ was detected in the effluent gas.

By means of an external electric heater, the $BF_3$ containing polyacrylonitrile-carbon particles were heated to 120° C. A $BF_3$-rich gaseous product was released by the heating; this gaseous product contained 80 mole percent of $BF_3$ and the remainder was ethane.

The polyacrylonitrile-carbon solid mass was exposed to five cycles of operation, i.e., removal of $BF_3$ from the 18 percent $BF_3$ containing feed and regeneration of the mass by heating to 120° C. At the end of these cycles, there was no significant decrease of capacity of the polyacrylonitrile-carbon mass for removing $BF_3$ from the feed stream.

Thus having described the invention, what is claimed is:

1. A process for recovering $BF_3$ from admixture with hydrocarbon gases, which process comprises contacting a solid mass consisting essentially of an inert particulate support and polyacrylonitrile positioned on said support with a first gaseous mixture consisting essentially of $BF_3$ and hydrocarbons, said contacting being carried out at a temperature between about 0° C. and about 50° C. and at super-atmospheric pressure, whereby $BF_3$ is removed from said first mixture onto said solid mass, withdrawing a second gaseous mixture of reduced $BF_3$ content from said contacting zone and heating said $BF_3$-containing solid mass to a temperature of at least about 100° C. under conditions to release a $BF_3$-rich gaseous product and to obtain a solid mass suitable for contacting additional amounts of said first gaseous mixture.

2. The process of claim 1 wherein said support is activated carbon.

3. The process of claim 1 wherein said first gaseous mixture consists essentially of $BF_3$ and ethane.

4. A $BF_3$ recovery process, which process comprises contacting, at a temperature between about 20° C. and about 50° C. and super-atmospheric pressure, a first gaseous mixture consisting essentially of $BF_3$ and non-condensible hydrocarbons and a particulate solid mass consisting essentially of activated carbon and polyacrylonitrile deposited on said carbon to remove $BF_3$ from said gaseous mixture, withdrawing a second gaseous mixture of reduced $BF_3$ content and heating the $BF_3$ containing mass at a temperature between about 120° C. and about 150° C. under conditions to release a $BF_3$-rich gaseous product from said mass and to obtain a solid mass suitable for contacting additional amounts of said first gaseous mixture.

References Cited in the file of this patent

UNITED STATES PATENTS 2,400,874    Burk _____ May 28, 1946

OTHER REFERENCES

Bowlus et al.: "The Action of Boron Fluoride on Organic Compounds," Journal of The American Chemical Society, volume 53, No. 10, October 1931, pages 3835–3840.

Laubengayer et al.: "Donor-Acceptor Bonding III, Methyl Cyanide Addition Compounds of Boron Trichloride and Boron Trifluoride," Journal of the American Chemical Society, vol. 67, No. 2, February 1945, pp. 164–167.

Chemical Abstracts, vol. 50, 12541[h], 1956.